United States Patent [19]
Rao

[11] Patent Number: 6,041,078
[45] Date of Patent: Mar. 21, 2000

[54] METHOD FOR SIMPLIFYING BIT MATCHED MOTION ESTIMATION

[75] Inventor: Sailesh Krishna Rao, Colts Neck, N.J.

[73] Assignee: Level One Communications, Inc., Sacramento, Calif.

[21] Appl. No.: 08/924,065

[22] Filed: Aug. 28, 1997

Related U.S. Application Data

[60] Provisional application No. 60/041,535, Mar. 25, 1997.

[51] Int. Cl.[7] .................................................. H04N 7/36
[52] U.S. Cl. ........................... 375/240; 348/416; 348/699
[58] Field of Search ..................................... 348/384, 390, 348/400, 401, 402, 409, 415, 416, 699, 700, 701; 382/232, 236, 238; 375/240

[56] References Cited

U.S. PATENT DOCUMENTS

| | | | |
|---|---|---|---|
| 4,924,306 | 5/1990 | van der Meer et al. | 348/701 |
| 5,376,971 | 12/1994 | Kadono et al. | 348/699 |
| 5,512,962 | 4/1996 | Homma | 348/699 |
| 5,563,813 | 10/1996 | Chen et al. | 708/201 |
| 5,585,862 | 12/1996 | Wuertele et al. | 348/699 |
| 5,612,746 | 3/1997 | Slavin | 348/420 |
| 5,650,829 | 7/1997 | Sugimoto | 348/699 |
| 5,654,762 | 8/1997 | Slavin et al. | 348/420 |
| 5,659,364 | 8/1997 | Aoki et al. | 348/416 |
| 5,696,836 | 12/1997 | Yoshino et al. | 348/699 |
| 5,793,985 | 8/1998 | Natarajan | 348/416 |
| 5,801,778 | 9/1998 | Ju | 348/416 |

FOREIGN PATENT DOCUMENTS 2 311 435  9/1997  United Kingdom.

OTHER PUBLICATIONS

Jian Feng et al., Adaptive Block Matching Motion Estimation Algorithm Using Bit–Plane Matching, Proceedings. International Conference on Image Processing (CAT. No. 95CB35819), Proceedings International Conference on Image Processing, Washington D.C. USA, Oct. 23–26, 1995, ISBN 0–7803–3122–2, 1995, Los Alamitos, CA USA, IEEE Comput. Soc. Press, USA, pp. 496–499 vol. 3.

Bhaskara and Konstantinides, Image and Video Compression Standards—Algorithms and Architectures—Second Edition, 1997, Kluwer Academic Publishers, Boston, pp. 136–137.

Mizuki, M. M. et al, A Binary Block Matching Architecture With Reduced Power Consumption and Silicon Area Requirement, 1996 IEEE International Conference on Acoustics, Speech, and Signal Processing—Proceedings. (ICASSP), Atlanta, May 7–10 1996, vol. 6, No. Conf. 21, May 7, 1996, Institute of Electrical and Electronics Engineers, pp. 3248–3251.

Gharavi, H. et al., Blockmatching Motion Estimation Algorithms—New Results, IEEE Transactions on Circuits and Systems, vol. 37, No. 5, May 1, 1990, pp. 649–651.

D. LeGall, "MPEG: A Video Compression Standard for Multimedia Applications," *Communication of the ACM*, vol. 34, No. 4, pp. 47–58 (Apr. 1991).

Yang et al., "A Family of VLSI Designs for the Motion Compensation Block–Matching Algorithm," *IEEE Trans. On Circuits and Systems*, vol. 36, No. 10, pp. 1317–1325 (Oct. 1989).

*Primary Examiner*—Bryan Tung
*Attorney, Agent, or Firm*—Merchant & Gould P.C.

[57] ABSTRACT

A method of performing motion estimation is disclosed which reduces the memory bandwidth requirements and simplifies the computations for performing block matching. First, multibit pixel values of frames are converted to single bit pixel values. Then, a previous frame of single bit pixel values and a reference frame of single bit pixel values are stored. To find a best match block in the previous frame, sum-of-absolute differences of pixel values between the reference frame and a block in a search area within the previous frame are compared. Finally, a motion vector representing the difference between the reference block and the best matched block in the previous frame is calculated. The value of a reference pixel is thresholded with respect to a low-pass filtered average value around the reference pixel. The reference pixel is substituted by the average value of the neighboring pixels. The multibit pixel values may be eight bit intensity values. Further, the reference block may be an 8 by 8 block of pixel values and the search area may be a 136 by 136 block of pixel values.

11 Claims, 2 Drawing Sheets

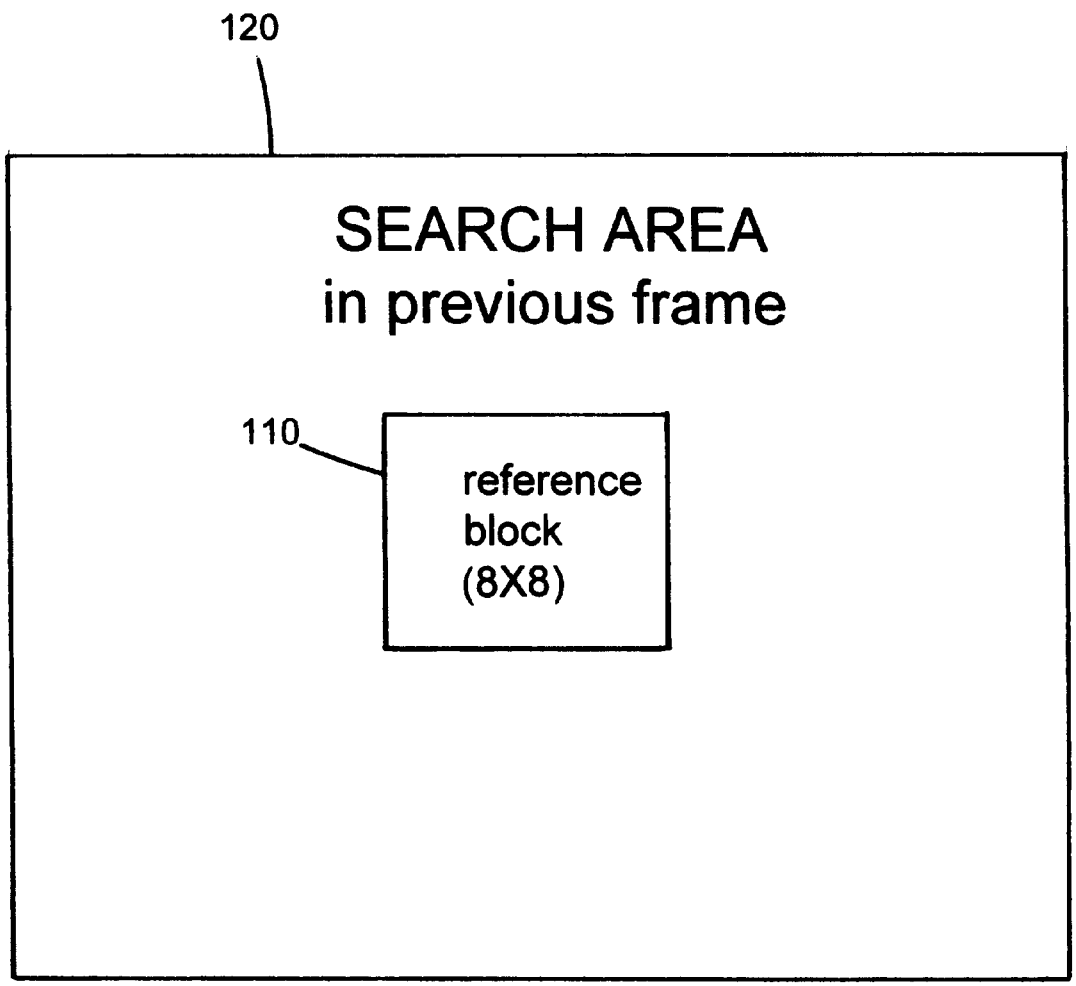

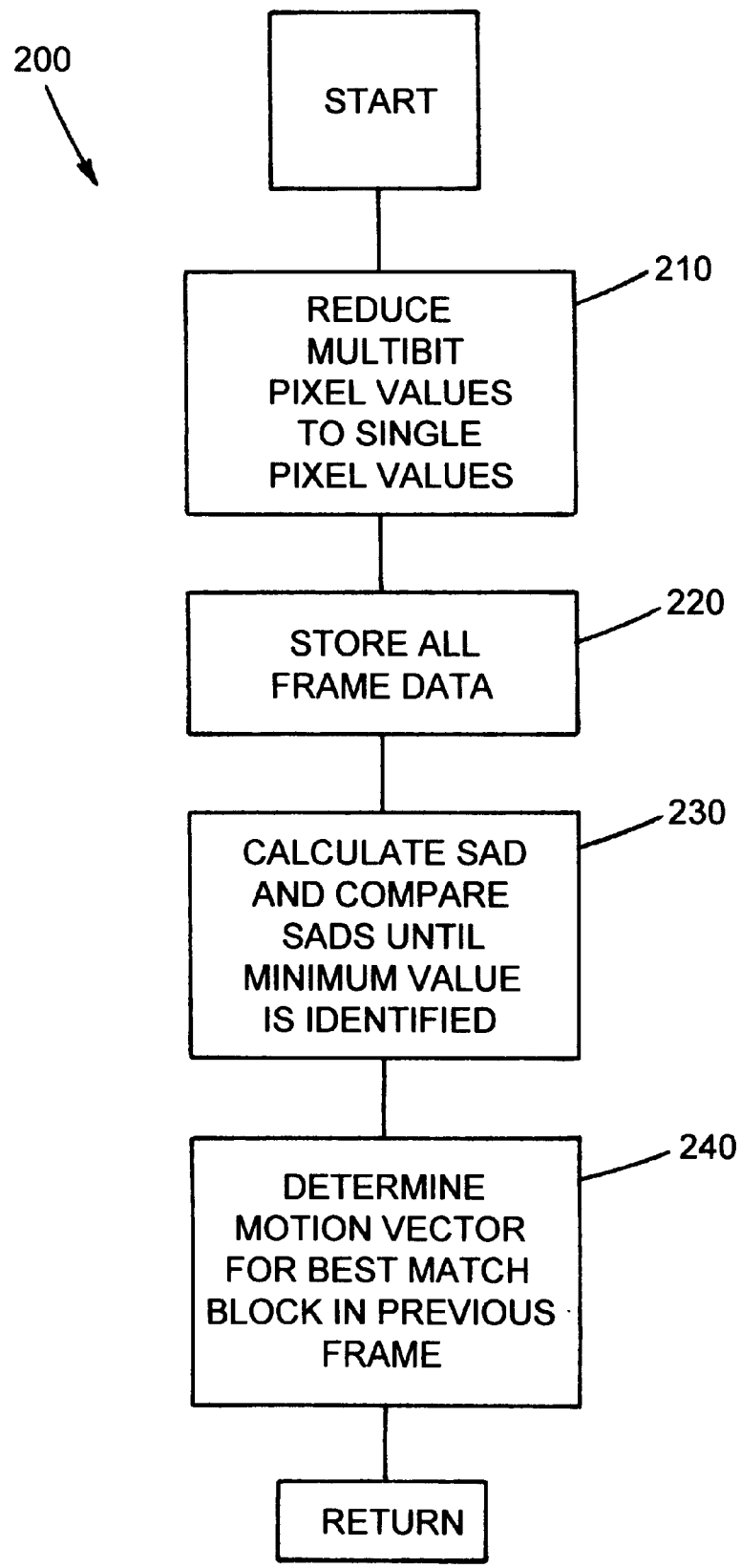

METHOD FOR SIMPLIFYING BIT MATCHED MOTION ESTIMATION

This application claims priority from Provisional Application number 60/041,535 filed Mar. 25, 1997.

BACKGROUND OF THE INVENTION

1. Field of the Invention.

This invention relates in general to a motion estimation method, and more particularly to a method for reducing the memory requirements and computational complexity for motion estimation.

2. Description of Related Art.

In recent years, the information transmitting media such as newspaper, TV, and radio have been flooded with information relative to multimedia. Multimedia refers to information presented in the combination of text, graphics, video, sound and the like. Since such information is general handled by a computer, and thus the data representative of the video and sounds as well as text and graphics are required to be digitized.

When data representative of a video such as a motion picture are digitized, the amount of digitized data is extremely large in comparison with data indicative of sound, text or graphics. For this reason, the data of a motion picture to be handled by the computer are required to be compressed when the data is stored in a storage device or transmitted over a communication line.

There have been a proposed wide variety of data encoder-decoders for compressing the data of a motion picture in accordance with the correlation between two pictures (occasionally referred to as frames) partly forming the motion picture. Estimating motion in image sequences is one of the most important functional blocks of a video coder-decoder. However, the matching of a reference block of an image frame with respect to a much larger search area in a previous frame requires significant computation.

A full motion video sequence usually contains a significant amount of frame-to-frame redundancy. For videophone or teleconferencing, motion in an entire scene is usually low and successive frames are highly correlated. In such a case, interframe coding techniques can reduce the information redundancy in video sequences and achieve high data compression.

The block matching motion compensation algorithm is widely used in many video coder-decoders to remove interframe redundancy. The block matching motion compensation algorithm is also recommended by several standards committees. The basic idea in the block matching algorithm is to provide the current frame in the video sequences into blocks, and for each block to search for a best matched block within a tracking range in an available previous frame. An area of measurement criterion is used for finding the best match. The threshold can be pre-assigned or adjusted by the fullness of the output buffer.

The displacement between the current block position data the best match one in the previous is called the motion vector. Given the motion vector information, the receiver can reconstruct the current frame using the available previous frame and the block differences. The better the motion compensated prediction, the higher is the expected efficiency in coding the block difference.

Among several possible searching methods, the full-search method, which searches all possible displays locations within the tracking area in the previous frame, gives the optimal solution. However, the full-search block matching method requires a huge number of operations. To perform this large number of operations sequentially, the cycle time can not be too great. Alternatively, inputting multiple data and performing parallel operations simultaneously has been proposed. However, this results in the pin count for data inputs and addressing to increase to an unreasonable number. Thus, this alternative method makes the implementation costly and infeasible.

Further, as mentioned above, motion estimation requires the matching of a reference block of an image frame with respect to a much larger search area in the previous frame. However, the memory required for the search area becomes very large. Further, the computation power is too large since each pixel in the reference block has to be subtracted from the corresponding pixel in the search block, and the absolute difference value must be accumulated, and the SAD values for all motion vectors must be compared to find the minimum value.

It can be seen then that there is a need for a motion estimation method that reduces the memory bandwidth requirements.

It can also be seen that there is a need for a motion estimation method that simplifies the computations for performing block matching.

SUMMARY OF THE INVENTION

To overcome the limitations in the prior art described above, and to overcome other limitations that will become apparent upon reading and understanding the present specification, the present invention discloses a method of performing motion estimation.

The present invention solves the above-described problems by providing a method of performing motion estimation which reduces the memory bandwidth requirements and simplifies the computations for performing block matching.

A method in accordance with the principles of the present invention includes the steps of converting multibit pixel values of frames to single bit pixel values, storing a previous frame of single bit pixel values and a reference frame of single bit pixel values, comparing a sum-of-absolute differences of pixel values between the reference frame and a block in a search area within the previous frame to find a best match block in the previous frame and calculating a motion vector representing the difference between the reference block and the best matched block in the previous frame.

Other embodiments of a system in accordance with the principles of the invention may include alternative or optional additional aspects. One such aspect of the present invention is that the step of converting multibit pixel values of frames to single bit pixel values further comprises the step of thresholding the value of a reference pixel with respect to a low-pass filtered average value around the reference pixel.

Another aspect of the present invention is that the reference pixel is substituted by the average value of the neighboring pixels.

Another aspect of the present invention is that the step of comparing a sum-of-absolute differences of pixel values between the reference frame and a block in the previous frame to find a best matched block in the previous frame further comprises the steps of calculating the absolute difference values between pixel values in the reference block and pixel values in the block in the previous frame, accumulating the calculated absolute difference values between pixel values in the reference block and pixel values in the block in the previous frame and identifying the best matched block in the previous frame as a block in the previous frame which results in a lowest accumulation of calculated absolute difference values.

Another aspect of the present invention is that the multibit pixel values comprise eight bit intensity values.

Still another aspect of the present invention is that the reference block comprises an 8 by 8 block of pixel values.

Another aspect of the present invention is that the search area comprises a 136 by 136 block of pixel values.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 1 illustrates a reference pixel block and a search area in a previous frame; and FIG. 2 illustrates a flow chart of the bit matched motion estimation method according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a simplified technique for implementing motion estimation in image sequences. The computation required for block matching is reduced by constructing a single bit version of both the reference block and the previous frame. The present invention also reduces the memory bandwidth requirement for retrieving the search area.

FIG. 1 illustrates a reference pixel block 110 and a search area in a previous frame 120. Typically, motion estimation requires the matching of the reference block 110 of an image frame with respect to the much larger search area in the previous frame 120. The best match is output along with the computed distance between the reference block 110 and the best matched block within the search area of the previous frame 120.

In a standard motion estimation algorithm, a block of 8×8 pixel values 112 in the current frame 110 is matched over a search area 120, typically 136×136 in MPEG-2 applications, and the best matched block in terms of the Sum-of-Absolute-Differences (SAD) is output. This requires that the SAD values for all motion vectors be compared to find the minimum value. The image compression algorithm then determines the difference pixel values between the reference block 110 and the best-matched block within the search area of the previous frame 120, and decides whether or not to code the reference block 110 in terms of motion vectors.

However, the search area 120 has to be drawn from memory for each block and therefore the memory bandwidth requirement for real-time motion estimation becomes very large, since each pixel is represented by multibit pixel values, e.g., 8-bit intensity values. Secondly, the computational complexity for calculating the Sum-of-Absolute-Differences (SAD) is extremely high. This is because each pixel in the reference block 110 has to be subtracted from the corresponding pixel in the blocks within the search area 120, and the absolute difference value must be accumulated.

FIG. 2 illustrates a flow chart 200 of the bit matched motion estimation method according to the present invention. The present invention reduces all pixels to a single bit by thresholding the value of a reference pixel with respect to a low-pass filtered average value around that pixel 210. The average value of the neighboring pixels is substituted for the reference pixel value.

After the multibit pixel values have been reduced to a single bit by the filter, all frames are stored 220. Thus, instead of having to retrieving 8-bit numbers for each pixel, only a single bit needs to be retrieved. This reduces the memory bandwidth requirement by a factor of 8.

Next, the best matched block in terms of the SAD is output by comparing the SAD values for all motion vectors to find the minimum value 230. The computation of the SAD according to the present invention is reduced to bit-wise exclusive OR operations followed by an accumulation of the difference bits. This also reduces the computational burden. Then, a motion vector representing the difference between the reference block and the matched previous block is coded 240.

In summary, the present invention initially reduces luminance frames to single bit values via a simple 2-D low pass filter and stores the resulting bit image for motion estimation purposes. The motion estimation is performed by comparing bits between the reference frame and the search frame, instead of integers. By reducing all image frames to single bit frames for the purpose of doing motion estimation, an order of magnitude reduction in the memory bandwidth requirement for motion estimation is achieved. Further, the block matching step is reduced to bit-wise convolution and is therefore computation is greatly simplified.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing motion estimation, comprising:

converting multibit pixel values of frames to single bit pixel values;

storing a previous frame of single bit pixel values and a reference frame of single bit pixel values;

comparing a sum-of-absolute differences of pixel values between the reference frame and a block in a search area within the previous frame to find a best match block in the previous frame;

calculating a motion vector representing the difference between the reference block and the best matched block in the previous frame; and wherein the step of converting multibit pixel values of frames to single bit pixel values further comprises the step of thresholding the value of a reference pixel with respect to a low-pass filtered average value around the reference pixel, and the value of the reference pixel is substituted by the average value of the neighboring pixels.

2. The method of claim 1 wherein the step of comparing a sum-of-absolute differences of pixel values between the reference frame and a block in the previous frame to find a best matched block in the previous frame further comprises the steps of:

calculating the absolute difference values between pixel values in the reference block and pixel values in the block in the previous frame;

accumulating the calculated absolute difference values between pixel values in the reference block and pixel values in the block in the previous frame; and identifying the best matched block in the previous frame as a block in the previous frame which results in a lowest accumulation of calculated absolute difference values.

3. The method of claim 1 wherein the multibit pixel values comprise eight bit intensity values.

4. The method of claim 1 wherein the reference block comprises an 8 by 8 block of pixel values.

5. The method of claim 4 wherein the search area comprises a 136 by 136 block of pixel values.

6. The method of claim 1 wherein the search area comprises a 136 by 136 block of pixel values.

7. A method for performing motion estimation, comprising:

converting multibit pixel values of frames to single bit pixel values;

storing a previous frame of single bit pixel values and a reference frame of single bit pixel values;

calculating the absolute difference values between pixel values in the reference block and pixel values in the block in the previous frame;

accumulating the calculated absolute difference values between pixel values in the reference block and pixel values in the block in the previous frame;

identifying the best matched block in the previous frame as a block in the previous frame which results in a lowest accumulation of calculated absolute difference values;

calculating a motion vector representing the difference between the reference block and the best matched block in the previous frame; and wherein the step of converting multibit pixel values of frames to single bit pixel values further comprises the step of thresholding the value of a reference pixel with respect to a low-pass filtered average value around the reference pixel, and the value of the reference pixel is substituted by the average value of the neighboring pixels.

8. The method of claim 7 wherein the multibit pixel values comprise eight bit intensity values.

9. The method of claim 7 wherein the reference block comprises an 8 by 8 block of pixel values.

10. The method of claim 9 wherein the search area comprises a 136 by 136 block of pixel values.

11. The method of claim 7 wherein the search area comprises a 136 by 136 block of pixel values.

* * * * *